US012656613B2

(12) United States Patent (10) Patent No.: US 12,656,613 B2
Wiersma et al. (45) Date of Patent: Jun. 16, 2026

(54) OPTICAL SYSTEMS AND DISPLAY ENGINES FOR AUGMENTED REALITY AND NEAR-EYE HEADSETS

(71) Applicant: Snap Inc., Santa Monica, CA (US)

(72) Inventors: Joshua T. Wiersma, Phoenix, AZ (US); Nicholas William Melena, Phoenix, AZ (US)

(73) Assignee: Snap Inc., Santa Monica, CA (US)

( * ) Notice: Subject to any disclaimer, the term of this patent is extended or adjusted under 35 U.S.C. 154(b) by 263 days.

(21) Appl. No.: 18/248,981

(22) PCT Filed: Oct. 12, 2021

(86) PCT No.: PCT/US2021/054516
§ 371 (c)(1),
(2) Date: Apr. 13, 2023

(87) PCT Pub. No.: WO2022/081537
PCT Pub. Date: Apr. 21, 2022

(65) Prior Publication Data
US 2023/0408824 A1      Dec. 21, 2023

Related U.S. Application Data

(60) Provisional application No. 63/090,763, filed on Oct. 13, 2020.

(51) Int. Cl.
*G02B 27/01* (2006.01)
*G02B 27/28* (2006.01)
(52) U.S. Cl.
CPC ....... *G02B 27/0172* (2013.01); *G02B 27/283* (2013.01); *G02B 27/286* (2013.01); *G02B 2027/015* (2013.01); *G02B 2027/0185* (2013.01)

(58) Field of Classification Search
CPC .............. G02B 27/0172; G02B 27/283; G02B 27/286; G02B 2027/015; G02B 2027/0185
See application file for complete search history.

(56) References Cited

U.S. PATENT DOCUMENTS 7,133,207 B2 * 11/2006 Travers ................ G02B 27/144
359/629
10,488,584 B2 11/2019 Karafin et al.
(Continued)

FOREIGN PATENT DOCUMENTS

CN 201589896 U 9/2010
CN 105675150 A 6/2016
(Continued)

OTHER PUBLICATIONS

"European Application Serial No. 21801792.9, Response to Communication pursuant to Rules 161 and 162 EPC filed Nov. 21, 2023", 15 pgs.
(Continued)

*Primary Examiner* — Cara E Rakowski
(74) *Attorney, Agent, or Firm* — Schwegman Lundberg & Woessner, P.A.

(57) ABSTRACT

Optical display engines with reduced size and/or increased efficiency for Augmented Reality (AR) and near-eye devices that incorporate LED, microLED, and/or OLED displays. Example optical systems provide different light paths for polarized (or split unpolarized) light, with recombining oppositely polarized light corresponding to different image portions/channels, in a compact system using polarized beam splitters, quarter wave plates, half wave plates, and reflective elements such as curved mirrors or reflective lenses, resulting in high optical power. Images and/or portions thereof are presented at multiple observation planes to project a more realistic synthetic image, and at different
(Continued)

angular resolutions to enable creation of a large composite field of view with high apparent resolution from a single small and efficient display.

33 Claims, 11 Drawing Sheets

(56)                    References Cited

U.S. PATENT DOCUMENTS

| | | | |
|---|---|---|---|
| 2014/0140653 A1 | 5/2014 | Brown et al. | |
| 2018/0275396 A1 | 9/2018 | Schowengerdt et al. | |
| 2020/0150429 A1 | 5/2020 | Hong | |
| 2021/0199969 A1* | 7/2021 | Chen | G02B 27/286 |
| 2022/0066212 A1* | 3/2022 | Mceldowney | G02B 27/0172 |
| 2022/0171190 A1* | 6/2022 | Trisnadi | G02B 27/283 |
| 2023/0004001 A1* | 1/2023 | Sulyok | G02B 27/0101 |

FOREIGN PATENT DOCUMENTS

| | | | |
|---|---|---|---|
| KR | 20110015011 A | 2/2011 | |
| KR | 102870578 B1 | 10/2025 | |
| TW | I690729 B | 4/2020 | |
| TW | 202223490 A | 6/2022 | |
| WO | WO-2017091538 A1 | 6/2017 | |
| WO | WO-2020069536 A1 | 4/2020 | |
| WO | WO-2022081537 A2 | 4/2022 | |
| WO | WO-2022081537 A3 | 4/2022 | |

OTHER PUBLICATIONS

"International Application Serial No. PCT/US2021/054516, International Preliminary Report on Patentability mailed Apr. 27, 2023", 13 pgs.
"Korean Application Serial No. 10-2023-7015856, Notice of Preliminary Rejection mailed Feb. 12, 2025", W/English Translation, 16 pgs.
"Korean Application Serial No. 10-2023-7015856, Response filed Apr. 3, 2025 to Notice of Preliminary Rejection mailed Feb. 12, 2025", w/ English claims, 32 pgs.
"Taiwanese Application Serial No. 202380064784.1, Office Action mailed Apr. 15, 2025", w/ English Translation, 15 pgs.
"Chinese Application Serial No. 202180069337.6, Office Action mailed May 24, 2025", w/ English Translation, 15 pgs.
"European Application Serial No. 21801792.9, Notification Regarding Rule 164 and Article 94(3) EPC mailed Jul. 8, 2025", 11 pgs.
"Taiwanese Application Serial No. 202380064784.1, Response filed Jul. 2, 2025 to Office Action mailed Apr. 15, 2025", w/ English Claims, 66 pgs.
"International Application Serial No. PCT/US2021/054516, International Search Report mailed Mar. 30, 2022", 10 pgs.
"International Application Serial No. PCT/US2021/054516, Invitation to Pay Additional Fees mailed Feb. 9, 2022", 13 pgs.
"International Application Serial No. PCT/US2021/054516, Written Opinion mailed Mar. 30, 2022", 12 pgs.
"Chinese Application Serial No. 202180069337.6, Notification of Paying the Restoration Fee mailed Sep. 18, 2025", W/English Translation, 2 pgs.
"Chinese Application Serial No. 202180069337.6, Response filed Sep. 11, 2025 to Office Action mailed May 24, 2025", W/ current English Claims, 11 pgs.
"Chinese Application Serial No. 202180069337.6, Response filed Oct. 13, 2025 to Notification of Paying the Restoration Fee mailed Sep. 18, 2025", w/o English Claims, 3 pgs.
"European Application Serial No. 21801792.9, Response filed Nov. 7, 2025 to Notification Regarding Rule 164 and Article 94(3) EPC mailed Jul. 8, 2025", 11 pgs.
"Chinese Application Serial No. 202180069337.6, Office Action mailed Nov. 6, 2025", w/ English Translation, 11 pgs.
"Chinese Application Serial No. 202180069337.6, Response filed Dec. 4, 2025 to Office Action mailed Nov. 6, 2025", w/ English Claims, 30 pgs.
"Chinese Application Serial No. 202180069337.6, Response to Examiner Telehphone Interview filed Dec. 18, 2025", w/ English claims, 18 pgs.

* cited by examiner

430

432

431

435

436

| Path 1 | Path 1 | Path 2 | Path 2 |
|---|---|---|---|
| Path 1 | Path 1 | Path 1 | Path 2 |
| Path 1 | Path 1 | Path 1 | Path 1 |
| Path 1 | Path 1 | Path 1 | Path 1 |

434

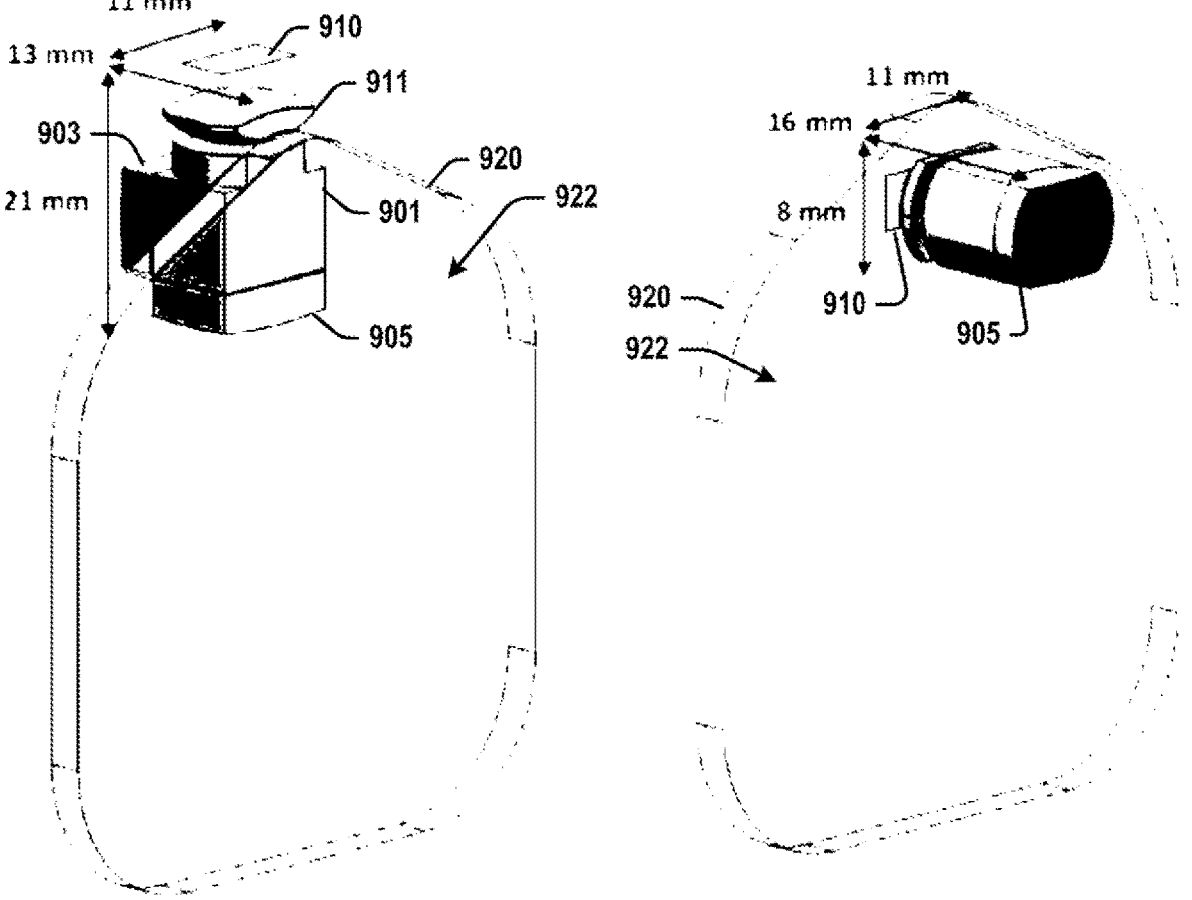
FIG. 9A                    FIG. 9B

OPTICAL SYSTEMS AND DISPLAY ENGINES FOR AUGMENTED REALITY AND NEAR-EYE HEADSETS

CROSS-REFERENCE TO RELATED APPLICATION

The present application is a U.S. National Stage Filing under 35 U.S.C. 371 from International Application No. PCT/US2021/054516, filed on Oct. 12, 2021, and published as WO 2022/081537 on Apr. 21, 2022, which application claims priority to U.S. Provisional Patent Application No. 63/090,763, filed Oct. 13, 2020, and entitled "OPTICAL SYSTEMS FOR MICROLED DISPLAYS IN AUGMENTED REALITY AND NEAR-EYE HEADSETS", the entire content of which is incorporated herein by reference.

FIELD OF THE DISCLOSURE

The present disclosure relates to optical display engines for displays, for example, emissive displays, such as LED (light-emitting diode) displays, including micro-LED displays. OLED displays, and micro-OLED displays. More particularly, the present invention is directed to optical display engines for emissive displays (e.g., LED displays, quantum dot displays, thin-film electroluminescent (TFEL) displays, plasma displays, and the like) or transmissive displays (e.g., liquid crystal displays (LCDs) and the like); for example, micro-LED displays that may be utilized in applications including, but not limited to, projectors, head-up displays, and augmented reality (AR), mixed reality (MR), and virtual reality (VR) systems or devices, such as headsets or other near-eye devices or systems.

BACKGROUND OF THE DISCLOSURE

AR images often involve overlaying a synthetic image (e.g., digital data, digital content media, or a computer generated image (e.g., a 3D image)) onto what a user is seeing in the real world. As the AR images are typically projected onto a single plane for the user to view, and real world images, which a user naturally sees, appear on continuous planes, there is often a mismatch between the synthetic images and the real world images. Consequently, the eye has to adjust between the two viewing perspectives, and over time, this may cause visual fatigue, for example, fatigue due to vergence-accommodation conflict (VAC). Increasing the size of an AR system to improve the VAC may not be feasible. Typical AR headsets are devices that fit on the face or around the head. In order to generate an AR image, the headsets have to accommodate many components, such as displays (including stereoscopic displays), optical components (e.g., an optical display engine), and power supplies. Consequently, AR headsets may be bulky and large in size. Increasing the size or volume of an AR system or device to address VAC fatigue may not improve the VAC, and may also reduce the optical power of the existing components.

BRIEF DESCRIPTION OF THE DRAWINGS

The present disclosure is illustrated and described herein with reference to the various drawings, in which like reference numbers are used to denote like system components, as appropriate, and in which:

FIGS. 9A-9B illustrate approximate dimensions of optical systems, according to an embodiment of the present invention.

DETAILED DESCRIPTION OF THE DISCLOSURE

Figure 1:
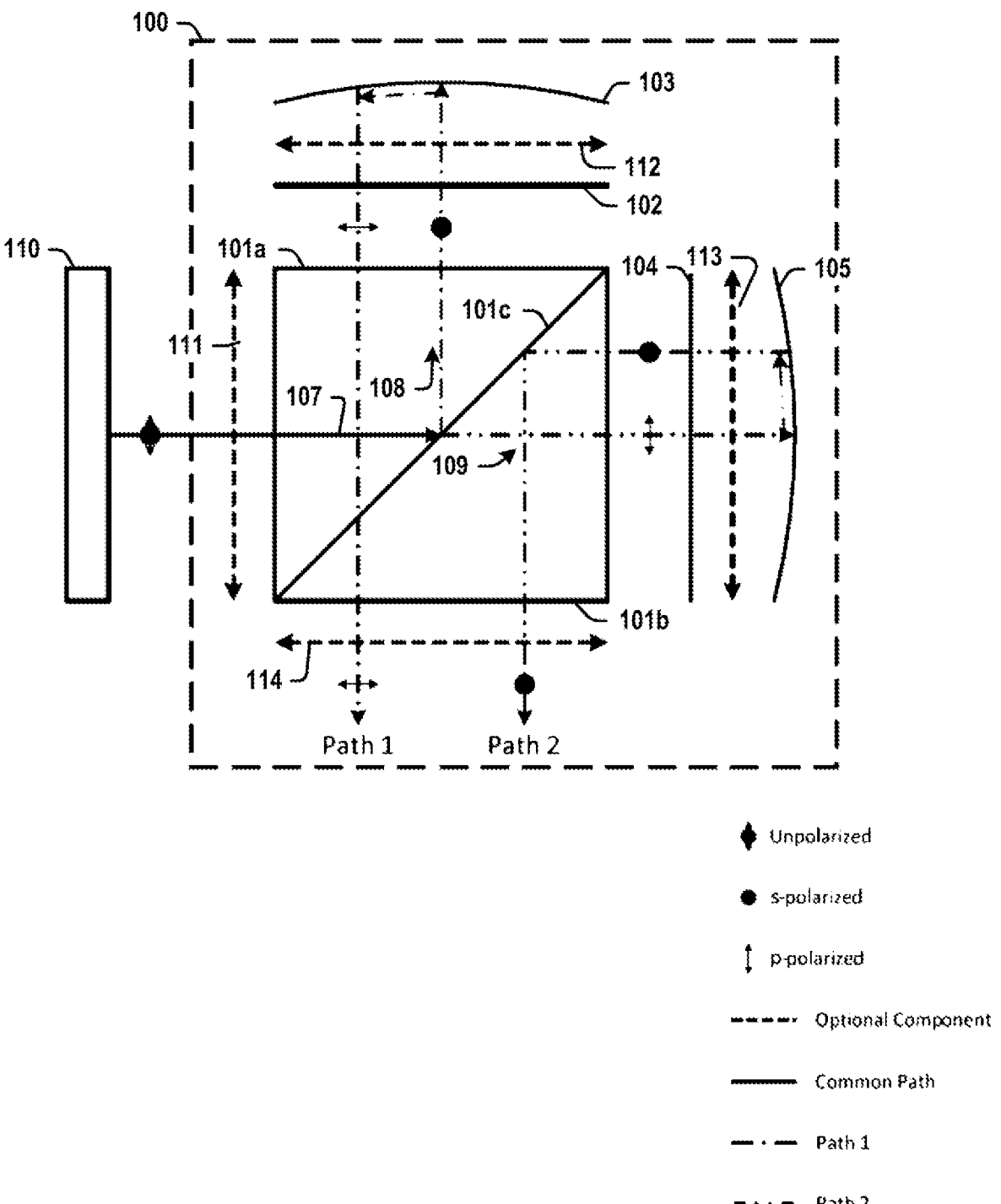
FIG. 1 illustrates an optical system for providing separate light paths for unpolarized light, according to an embodiment of the present invention.

Example embodiments described herein provide optical systems and optical display engines that split or divide electromagnetic radiation (e.g., light) output from a spatial light modulator or display into differently-polarized light beams and provide separate light paths for each differently-polarized light beam, enabling recombined light beams to be routed to, to be transmitted to, or to be received by or incident on different observation planes. Components of the optical display engines described herein are arranged to maximize optical power and/or brightness from limited brightness displays, such as micro-LED, etc. Further, the disclosed embodiments reduce the size and/or increase the efficiency of a display system or device that integrates, includes, or is coupled to (physically and/or electrically), a display, for example, an LED display, such as a micro-LED display and/or OLED display into such system or device. For purposes of this disclosure, the invention is described using LED displays as an example. However, the present invention is applicable to emissive displays of any type, shape, and/or size, and this would be obvious to one of ordinary skill in the art. An embodiment of the present invention may receive either unpolarized or linearly polarized light, and route light components of different polarizations into separate light paths, via novel arrangements or combinations of optical components (for example, polarizing beam splitters (PBS), quarter wave plates (QWP), and reflective components such as mirrors or reflective lenses).

An embodiment of the present invention projects different images or portions of images on different observation planes, by virtue of the separate light paths associated with different types of polarization. This may be desirable in AR headsets, in order to project a more realistic synthetic image (e.g., a computer-generated image or a computer-generated 3D image), and improve user comfort.

An embodiment of the present invention projects (or displays) images or portions of images at different resolutions, enabling display of a large composite field of view (FOV) with high apparent resolution from a single small and efficient display.

A display system, in accordance with the present invention, includes a polarizing beam splitter (PBS), a first quarter wave plate (QWP) positioned outside a first side of the PBS, a first reflective element positioned adjacent the first QWP, a second QWP positioned outside a second side of the PBS, and a second reflective element positioned adjacent the second QWP. A first light path for a first type of polarization is created by at least a combination of the PBS, the first QWP, and the first reflective element, and a second light path for a second type of polarization is created by at least a combination of the PBS, the second QWP, and the second reflective element. In an embodiment of the present invention, the PBS is positioned to receive one or more light beams from a display device via a third side, and to output the one or more light beams traversing the first and second light paths to one or more observation planes via a fourth side. In some embodiment of the present invention, the display device comprises one or more of a light emitting diode (LED), micro-LED, organic LED (OLED), micro-OLED, or liquid crystal display (LCD). In an embodiment of the present invention, the display device emits at least one unpolarized light beam. The PBS splits the unpolarized light beam into a first light component with the first type of polarization and a second light component with the second type of polarization, reflects the first light component into the first light path to the first QWP and first reflective element, and transmits the second light component into the second light path to the second QWP and second reflective component. In an embodiment of the present invention, a polarization of each of the first and second light components is reversed as the first and second light components respectively travel along the first and second light paths. For instance, the first light component is s-polarized (also referred to as σ-polarized or transverse-electric (TE)) as it enters the PBS and becomes p-polarized (also referred to as π-polarized or transverse-magnetic (TM)) upon entering the first light path, passing through the first QWP to the first reflective element, being reflected by the first reflective element, and passing back through the first QWP and into the PBS, wherein the PBS transmits the first light component through the fourth side. Further, the second light component is p-polarized as it enters the PBS and becomes s-polarized upon entering the second light path, passing through the second QWP to the second reflective element, being reflected by the second reflective element, and passing back through the second QWP and into the PBS, wherein the PBS transmits the second light component through the fourth side.

In another embodiment of the present invention embodiment described herein, the display system further includes a polarizer positioned between the display device and the PBS, wherein the unpolarized light beam becomes a polarized light beam as it passes through the polarizer, and a half wave plate (HWP) positioned between the polarizer and the PBS, wherein the HWP rotates a polarization of the polarized light beam, such that the polarized light beam is directed into one of the first or second light paths depending on the rotation of the polarization. For example, the polarized light beam is s-polarized as it enters the PBS, and becomes p-polarized upon entering the first light path, passing through the first QWP to the first reflective element, being reflected by the first reflective element, and passing back through the first QWP and into the PBS. For example, the polarized light beam is p-polarized as it enters the PBS, and becomes s-polarized upon entering the second light path, passing through the second QWP to the second reflective element, being reflected by the second reflective element, and passing back through the second QWP and into the PBS. In one embodiment of the present invention, the HWP comprises a controllable HWP and is coupled to a controller that determines how the controllable HWP rotates the polarization of the polarized light beam. The controllable HWP rotates the polarization of differently polarized light beams at different particular instances in time. In another embodiment of the present invention, the HWP comprises an addressable HWP, the addressable HWP further comprising a plurality of independently controlled elements, wherein each of the independently controlled elements rotates a polarization of the polarized light beam. Separate portions of the plurality of independently controlled elements rotate the polarization of different light beams associated with separate image portions. In some embodiment of the present invention, the addressable HWP comprises one or more of a spatial light modulator or a transmissive spatial light modulator.

In further embodiment of the present invention embodiments described herein, the one or more light beams output via the fourth side of the PBS are incident on one or more input gratings. For example, the one or more input gratings comprise polarization-sensitive input gratings, wherein a first light beam exiting the first light path with the second type of polarization is incident on a first input grating, and wherein a second light beam exiting the second light path with the first type of polarization is incident on a second input grating. In some embodiment of the present invention, the one or more input gratings comprise electrically-switchable input gratings. In some embodiment of the present invention, each of the one or more input gratings is coupled to a waveguide combiner. For instance, an exemplary optical system can further include an output grating or waveguide grating coupled to the waveguide combiner, wherein the one or more light beams propagate along the waveguide combiner until reaching the output grating and are thereby directed to the corresponding observation plane. A difference between observation planes can be created by using different combinations of components or optical parameters (e.g., mirror shape, waveguide characteristics, refractive elements, etc.) in the two light paths. Alternatively or in addition, the output gratings themselves may have different amounts of optical power encoded into them, such that the two light paths are optically the same, and the differences in observation plane distance results from the output gratings themselves. The one or more light beams may correspond to a synthetic image, and wherein the output grating directs the synthetic image to the eye such that the eye simultaneously perceives both the synthetic image and reality, thereby to generate an augmented reality (AR) image in which the synthetic image appears as if it is combined and/or overlaid with a real-world scene in the viewer's FOV. In an embodiment of the present invention, a waveguide combiner may include a holographic polymer dispersed liquid crystal (HPDLC). The present invention is not limited to HPDLC-type waveguide combiners, and in practice any polarization selective grating may be used.

As required, detailed embodiments are disclosed herein. It must be understood that the disclosed embodiments are merely exemplary of various and alternative forms. As used herein, the word "exemplary" is used expansively to refer to embodiments that serve as illustrations, specimens, models, or patterns. The figures are not necessarily to scale and some features may be exaggerated or minimized to show details of particular components. In other instances, well-known components, systems, materials, or methods that are known to those having ordinary skill in the art have not been described in detail in order to avoid obscuring the present disclosure. Therefore, specific structural and functional details disclosed herein are not to be interpreted as limiting, but merely as a basis for the claims and as a representative basis for teaching one skilled in the art.

In the following detailed description, reference is made to the accompanying drawings which form a part hereof and in which are shown, by way of illustration, embodiments that may be practiced. It is to be understood that other embodiments may be utilized and structural or logical changes may be made without departing from the scope. Therefore, the following detailed description is not to be taken in a limiting sense, and the scope of embodiments is defined by the appended claims and their equivalents.

The description may use perspective-based descriptions such as up/down, back/front, and top/bottom. Such descriptions are merely used to facilitate the discussion and are not intended to restrict the application of disclosed embodiments. The terms "coupled" and "connected," along with their derivatives (e.g. "communicatively coupled"), may be used. It should be understood that these terms are not intended as synonyms for each other. Rather, in particular embodiments, "connected" may be used to indicate that two or more elements are in direct physical contact with each other. "Coupled" may mean that two or more elements are in direct physical contact. However, "coupled" may also mean that two or more elements are not in direct contact with each other, but yet still cooperate or interact with each other, as is the case, for example, when two or more elements are optically coupled (i.e., where electromagnetic radiation, for example, light, is transmitted or directed (in some cases along a path known as an optical path) between to components, elements, and/or planes in space) or electrically coupled via for example, a wired or wireless connection. For the purposes of the description, a phrase in the form "A/B," "A or B," or in the form "A and/or B" means (A), (B), or (A and B). For the purposes of the description, a phrase in the form "at least one of A, B, and C" means (A), (B), (C), (A and B), (A and C), (B and C), or (A, B and C). For the purposes of the description, a phrase in the form "(A)B" means (B) or (AB) that is. A is an optional element.

The descriptions may use the terms "embodiment" or "embodiments," which may each refer to one or more of the same or different embodiments. Furthermore, the terms "comprising," "comprises," "including," "having," and the like, as used with respect to embodiments, are synonymous, and are generally intended as "open" terms (e.g., the term "including" should be interpreted as "including but not limited to," the term "having" should be interpreted as "having at least," the term "includes" should be interpreted as "includes but is not limited to," etc.). With respect to the use of any plural and/or singular terms herein, those having skill in the art can translate from the plural to the singular and/or from the singular to the plural as is appropriate to the context and/or application. The various singular/plural permutations may be expressly set forth herein for sake of clarity.

Various embodiments are now described with reference to the drawings, wherein like reference numerals are used to refer to like elements throughout. In the following description, for purposes of explanation, numerous specific details are set forth in order to promote a thorough understanding of one or more embodiments. It may be evident in some or all instances, however, that any embodiment described below can be practiced without adopting specific design details described below.

FIG. 1 illustrates an embodiment of the present invention of an optical display system including an optical display engine 100 and a display 110. Optical display engine 100 can include a polarizing beam splitter (PBS) 101 (in the illustrated example, including two separate halves 101a, 101b, and an interface 101c therebetween), at least two quarter-wave plates (QWP) 102, 104, and at least two reflective elements 103, 105. The interface 101c is not a separate component but the location where the one of the halves meets the other of the halves. In some implementations, however, an additional component such as a coating, a grating, a film, and/or an adhesive may be disposed along the interface 101c. In one embodiment of the present invention, the at least two QWPs 102, 104 are placed or located outside of the PBS 101. In one embodiment of the present invention, a first QWP 102 is placed or located outside of a first side of the PBS 101 (the top side of PBS 101 as shown in FIG. 1). In an embodiment of the present invention, the first QWP 102 is placed or located between the PBS 101 and a first reflective element 103. In an embodiment of the present invention, a second QWP 104 is placed or located outside of a second side of the PBS 101 (the side opposite a side facing display device 110). In an embodiment of the present invention, the second QWP 104 is placed or located between the PBS 101 and a second reflective element 105. In the embodiment shown in FIG. 1, the at least two QWPs 102, 104 and the at least two reflective elements 103, 105 are placed or located outside of the PBS 101 and along adjacent sides of the PBS 101, such that the first QWP 102 and the second QWP 104 form a right angle with one another.

In an embodiment of the present invention, QWPs 102, 104 can be laminated on, coupled to or attached to the PBS 101. In an embodiment of the present invention, the reflective elements 103, 105 can include curved mirrors or reflective lenses, which may impart more optical power and less dispersion relative to refractive lenses for a given curvature.

In operation, a display device 110 (e.g., an unpolarized display, such as micro-LED display without a polarizer or polarizing film), in accordance with the present invention, generates or outputs an image in the form of an unpolarized light beam 107 directed towards PBS 101. In an embodiment of the present invention, the display 110 may be, for example, an LED display, including, but not limited to, a micro-LED display and an OLED display. The PBS 101 polarizes the unpolarized light beam 107 by transmitting the incoming light with electric field parallel to the plane of incidence (p-polarized) and reflecting the light with field perpendicular to the plane (s-polarized). For example, the electric field of the s-polarized light oscillates along the z-axis, and the electric field of the p-polarized light oscillates in the x-y plane. In an embodiment of the present invention, the PBS 101 splits the unpolarized light into a first light component that is reflected along a first light path 108 (also referred to as "path 1"), and a second light component that is transmitted along a second light path 109 (also referred to as "path 2). For example, the PBS 101 may be formed from the joining or coupling of two halves 101a, 101b (for example, two prisms), resulting in an interface 101c between the two halves. In some embodiment of the present invention, the PBS 101 may be a single device or structure (formed, for example, from a mold or formed by other figure-forming methods) whereby materials for each of the halves 101a, 101b are selected such that p-polarized light is transmitted through interface 101c, and s-polarized light is reflected by interface 101c. In one embodiment of the present invention, one or more the halves 101a, 101b of the PBS 101 may be coated on a side of the halves 101a, 101b, that faces the other of the halves 101a, 101b (i.e., coated where the two halves 101a, 101b interface or meet with each other or at the interface 101c of the two halves 101a, 101b). In a further embodiment of the present invention, the PBS 101 may include a grating or film at the interface 101c of the two halves 101a, 101b. The grating or film at the interface 101c may be formed by patterning the surface of one or both of the two halves 101a, 101b and/or by disposing one or more material layers between the two halves 101a, 101b. The coatings and/or the gratings or films are dimensioned such that p-polarized light is transmitted and s-polarized light is reflected or vice versa.

Further, in an example operation, when the unpolarized light beam 107 is initially received (i.e., the first pass of the light beam 107 through the PBS 101), the PBS 101 reflects s-polarized light along the first path 108, until its polarization is changed to p-polarized light by the first QWP 102 before making a second pass through the PBS 101. Further, when the unpolarized light beam 107 is initially received (i.e., the first pass of the light beam 107 through the PBS 101), the PBS 101 transmits a p-polarized light component along the second path 109, until its polarization is changed to s-polarized light by the second QWP 104 before making a second pass through the PBS 101. In both of the now two paths (i.e., the light paths 108, 109) the light traveling through the PBS 101, the at least two QWPs 102, 104 are oriented such that the each of the QWPs 102, 104 converts the polarization of the p-polarized and the s-polarized light components from linear polarized light to circularly polarized light on the first pass through the at least two QWPs 102, 104. (i.e., from linear polarization to circular polarization), respectively. This may be accomplished, e.g., by orienting the at least QWPs 102, 104 such that their respective fast axes are oriented at an angle of forty-five degrees relative to the polarization direction of the incident linearly-polarized light.

The one or more reflective elements 103, 105 respectively impart optical power and change the handedness (e.g., left to right handedness or vice versa) of the polarization of the polarized light components traveling along each light path. The light components, which are now polarized light components of a different handedness, then pass through each of the QWPs 102, 104, a second time respectively. During the second pass, each of the QWPs 102, 104 converts the light components along the first and second paths 108, 109 back to linear polarization, but to an orientation that is orthogonal to the orientation of each of the light components during the first pass of the light components through the QWPs 102, 104, as a result of the change in handedness. Consequently, each light component exits an exit face of the PBS 101 (for example, the bottom face of PBS 101 as shown in FIG. 1). While FIG. 1 illustrates the outgoing light component corresponding to the first path 108 and the outgoing light component corresponding to the second path 109 as being laterally separated for purposes of explanation, in practical implementations, the outgoing light components may be combined (i.e., substantially coaxial).

In an embodiment of the present invention, a reflective element 103, 105 may be, for example, a reflective lens, mirror with a curvature, a deformable mirror, a movable mirror, or a substrate with a reflective surface or property. In an embodiment of the present invention, the at least two reflective elements 103, 105 are positioned the same distance away from the PBS 101. It should be understood by one of ordinary skill in the art that a mirror is any reflective lens or device. Thus, the light components (i.e., the s-polarized light component and the p-polarized light component corresponding to portions of an image displayed by display device 110) are reflected off the respective reflective elements 103, 105, and are combined in the PBS 101. In other words, the original unpolarized light beam 107 is initially split into light components of two polarizations on the first pass through the PBS 101, each light component traversing a separate light path 108, 109, and then the light components are recombined in the PBS 101 during the second pass through the PBS 101. Unlike known relevant art, this exemplary configuration achieves these effects in a compact system, as the splitting of the unpolarized light and subsequent recombining, for example, in the PBS 101, both reduces a spatial volume of the optical display engine 100 and also eliminates or minimizes a need for a brighter display (as would be the case, for example, in a system with only a single optical path), which may be required in existing systems.

Further, in an embodiment of the present invention, one or more refractive lenses 111, 112, 113, 114 can be incorporated into the optical system of FIG. 1. In an embodiment of the present invention, a micro-LED display 110 is placed or located in front of or on one side of a first refractive lens 11 and such refractive lens 111, for example, focuses the light beam(s) transmitted (directly when placed in a position where the light from the display 110 reaches the refractive lens 111 before it reaches the PBS 101 and/or indirectly when placed in a position where the light from the display 110 reaches the refractive lens III after it reaches the PBS 101) from display 110. In an embodiment of the present invention, a PBS 101 is placed or located after the first refractive lens 111, such that light transmitted from the display 110 travels along a path (e.g., an optical path) to the PBS 101 directly or indirectly (e.g., indirectly when another element or optical component is placed in the optical path after the refractive lens 111, but before the PBS 101) via refractive lens 111. In an embodiment of the present invention, the PBS 101 is placed or located on the other side of the first refractive lens 111 (i.e., on the side opposite the display 110). In an embodiment of the present invention, the first refractive lens 111 is placed or located outside of a first side of the PBS 101, and a second refractive lens 112 is placed or located outside of a second side of the PBS 101. In an embodiment of the present invention, the second refractive lens 112 is placed or located outside of a side of the PBS 101 that is perpendicular to the side of the PBS 101 of which the first refractive lens 111 is placed or located. In an embodiment of the present invention, a third refractive lens 113 is placed or located outside of a third side of the PBS 101, and a fourth refractive lens 114 is placed or located outside of a fourth side of the PBS 101. In an embodiment of the present invention, the third refractive lens 113 is placed or located outside a side of the PBS 101 that is opposite to the side of the PBS 101 from which the first refractive lens is placed or located. In an embodiment of the present invention, the fourth refractive lens 114 is placed or located outside a side of the PBS 101 that is opposite to the side of the PBS 101 of which the second refractive lens 112 is placed or located. It will be understood by those of ordinary skill in the art, in light of this disclosure, that usage of one, some, or all of the refractive lenses 111-114 is optional, depending on whether and to what extent particular components of light are to be modified (e.g., refracted, shaped, etc.), and that the optical power and effects accomplished by the optical display engine 100 can be attributed to the reflective elements 103, 105.

In an embodiment of the present invention, the refractive lenses 111-114 and the reflective elements 103, 105 together form an eyepiece or optical assembly that presents an image generated by the display 110 to an observer. Although depicted as single elements in FIG. 1, it would be understood by one of ordinary skill in the art that the refractive and reflective functions may be 1) decomposed into multiple elements in various locations to reduce optical aberrations; or 2) be accomplished by one or more components (optical or otherwise). The reflective elements 103, 105 have a large amount of optical power with practically no dispersion relative to refractive lenses, and therefore the use of such reflective lens or lenses enable compact systems (e.g., display systems). The changing of the polarization handedness upon reflection in combination with the operation of the QWPs 102, 104 allows for an efficient and compact system. In an embodiment of a display system in accordance with FIG. 1, splitting of the light corresponding to an image into oppositely polarized light components, and recombining the light components, achieves the advantages of reduced engine volume/size or increases optical efficiency.

Figure 2:
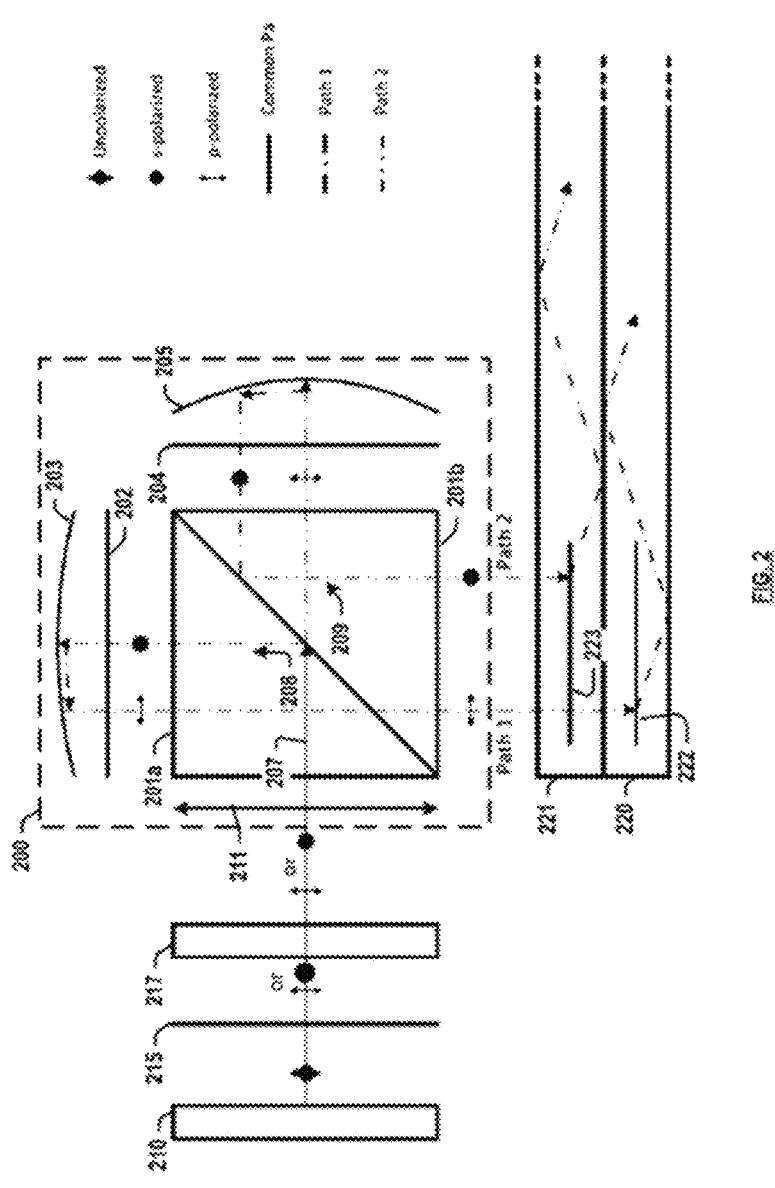
FIG. 2 illustrates an optical system for providing separate light paths for selectively polarized light, according to an embodiment of the present invention.

FIG. 2 illustrates an optical system for providing separate light paths for differently polarized light, according to an embodiment of the present invention. In this embodiment of the present invention, an unpolarized light beam emitted from display device 210 is linearly polarized by a polarizer 215, and the polarization is rotated and/or controlled by a half wave plate (HWP) 217. Thus, the unpolarized light beam becomes a polarized light beam 207 after it passes through the polarizer 215, and when the polarized light beam 207 reaches HWP 217, the HWP 217 rotates a polarization of the polarized light beam such that the polarized light beam is directed into one of the first light path 208 or the second light path 209 depending on the rotation of the polarization. For example, if the HWP 217 is controlled to rotate the polarized light beam 207 such that it is s-polarized upon entering the display engine 200, then as the s-polarized light beam 207 travels through the display engine 200, it becomes p-polarized because it travels along the first light path 208, passes through the first QWP 202 to the first reflective element 203, is reflected by the first reflective element 203, and passes back through the first QWP 202 and into the PBS 201.

Conversely, when the HWP 217 rotates the polarized light beam 207 such that it is p-polarized upon entering the display engine, then as the p-polarized light beam 207 travels through the display engine 200, it becomes s-polarized because it travels along the second light path 209, passes through the second QWP 204 to the second reflective element 205, is reflected by the second reflective element 205, and passes back through the second QWP 204 and into the PBS 201. Both light components (e.g. the separate light beams traversing light paths 208, 209) are combined in PBS 201 and emitted from the bottom side of PBS 201 (with "bottom side" referring to the orientation illustrated in FIG. 2). While FIG. 2 illustrates the outgoing light component corresponding to the first path 208 and the outgoing light component corresponding to the second path 209 as being laterally separated for purposes of explanation, in practical implementations the outgoing light components may be combined (i.e., substantially coaxial).

In an embodiment of the present invention, the position of reflective element(s) 203 relative to QWP 202 is different than the position of reflective element(s) 205 relative to QWP 204. In an embodiment of the present invention, the curvatures of reflective elements 203 and 205 are different. In one embodiment of the present invention, the one or more reflective elements 203, 205 can include deformable or movable mirrors that enable control over an observation distance via the changing of the power and/or position of the reflective elements 203, 205. In an embodiment of the present invention, the optical power of a reflective element 203, 205 is changed by deforming the surface, which alters the curvature of the reflective element 203, 205, such that, during operation, each of the initial p-polarized light and s-polarized light components 208, 209 are reflected off an optical element within optical display engine 200. These modifications enable changing the focal position and observation distance of light corresponding to Path 1 vs light corresponding to Path 2 (i.e., a perceived distance from the eye of a viewer to an observation plane, as further described in FIG. 7) via the different or variable optical power and/or position (where doing any one of deforming, changing the curvature, and/or changing the position may change the optical power, focal distance, and/or observation distance) of the reflective elements 203, 205.

Figure 3:
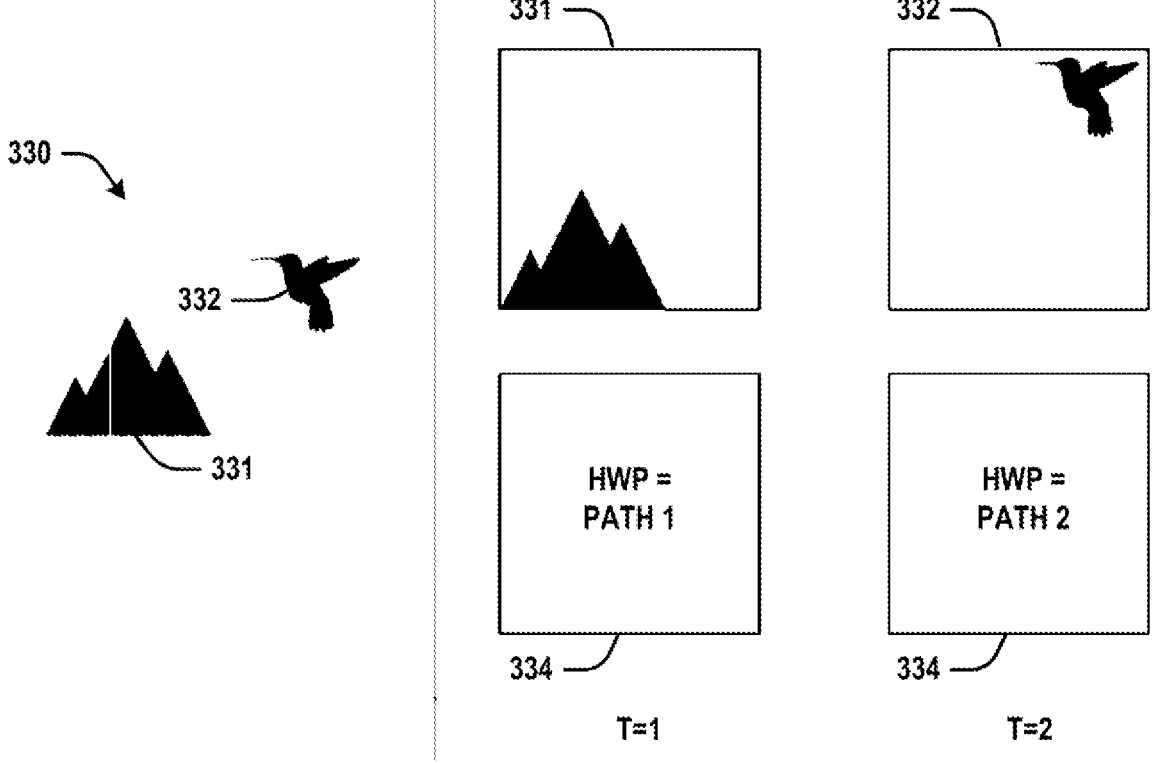
FIG. 3 illustrates portions of an image routed through separate light paths and incident on different observation planes, according to an embodiment of the present invention.

In one embodiment of the present invention, the HWP 217 comprises a controllable HWP and is coupled to a controller (not illustrated herein) that determines how the controllable HWP 217 rotates the polarization of the polarized light beam 207. The controller may provide a control signal to controllable HWP 217 that causes the HWP 217 to rotate the polarization of differently polarized light beams at different particular instances in time. For example, the controllable HWP 217 may include a liquid crystal layer, and the control signal may cause the orientation of liquid crystals in the liquid crystal layer to change. In another embodiment of the present invention, the HWP 217 comprises an addressable HWP, the addressable HWP further comprising a plurality of independently controlled polarization elements (which may be referred to as pixels), wherein each of the independently controlled elements rotates a polarization of the polarized light beam. Separate portions of the plurality of independently controlled elements rotate the polarization of different light beams associated with separate image portions. In an embodiment of the present invention, the addressable HWP 217 comprises one or more spatial light modulators or transmissive spatial light modulators, and the control output or signal (e.g., a voltage or mechanical output) may cause one or more modulating elements of the spatial light modulators and/or transmissive spatial light modulators to change in orientation. See, for example, FIGS. 3 and 4 illustrating different image portions resulting from different configurations of controllable and addressable HWPs, respectively.

In an embodiment of the present invention, the HWP 217 (whether controllable or addressable) can be external to the optical display engine 200. In an embodiment of the present invention, the HWP 217 can be assembled in a package with the display 210. In an embodiment of the present invention, the polarizer 215 can be external to the optical display engine 210. In an embodiment of the present invention, the polarizer 215 can be assembled in a package that includes the display 210. In an embodiment of the present invention, the polarizer 215 can be positioned between the display 210 and the HWP 217. In an embodiment of the present invention, the HWP 217 is placed or located between the polarizer 215 and a refractive lens 211. In an embodiment of the present invention, a controllable HWP 217 can be a device that includes liquid crystal between transparent electrodes (for example, a liquid crystal cell) which is controlled to change its orientation, thereby to impart a corresponding polarization to light passing therethrough. In an example, the controllable HWP 217 rotates the polarization of the image/ light polarized by the polarizer 215, and thereby determines which light path 208, 209 is traversed by the polarized light beam 207. In an example, the controllable HWP 217 is controlled (for example, by a controller or driver circuitry and/or software that modulated the electric field across the electrodes of the controllable HWP 217) such that the controllable HWP 217 rotates the polarization of the polar- ized light beam 207, and thereby determines which light path 208, 209 is followed. In an example, the controllable HWP 217 outputs either p-polarized light or s-polarized light. In an example, the controllable HWP 217 is set to a position or positioned such that either p-polarized light or s-polarized light is output or transmitted by the controllable HWP 217. In an example, the controllable HWP 217 is utilized to rotate or pass an image or image portion of a particular polarization, in a time-divisional manner, and thereby cause light to traverse either the first light path 208 or the second light path 209 in a time-divisional manner (see, for example, the embodiment illustrated in FIG. 3). In an example, when the controllable HWP 217 transmits s-polarized light, the light beam 207 follows light path 208. In an example, when the controllable HWP 217 transmits p-polarized light, the light beam 207 follows light path 209.

In an embodiment of the present invention, the one or more light beams output via the exit face (the bottom face in FIG. 2) of the PBS are incident on one or more input gratings 222, 223. The input gratings couple light traversing the light paths 208, 209 into the waveguides 220, 221, respectively. For example, the one or more input gratings 222, 223 comprise polarization-sensitive input gratings, wherein a first light beam exiting the first light path 208 with the second type of polarization is incident on a first input grating 222, and wherein a second light beam exiting the second light path 209 with the first type of polarization is incident on a second input grating 223. In some examples, the one or more input gratings 222, 223 comprise electrically-switch- able input gratings and/or polarization-selective gratings, such that the incident light is coupled into the corresponding waveguide depending on the state of the switch. In some examples, each of the one or more input gratings 222, 223 is respectively positioned in and/or coupled to a waveguide combiner 220, 221. Further, an output grating (discussed in more detail below with regard to FIG. 7) can be coupled to the waveguide combiners 220, 221, wherein the one or more light beams propagate along the waveguide combiner until reaching the output grating, wherein the output grating combines the synthetic image with reality to generated an augmented reality (AR) image (see, for example, the embodiment illustrated in FIG. 7).

Figure 7:
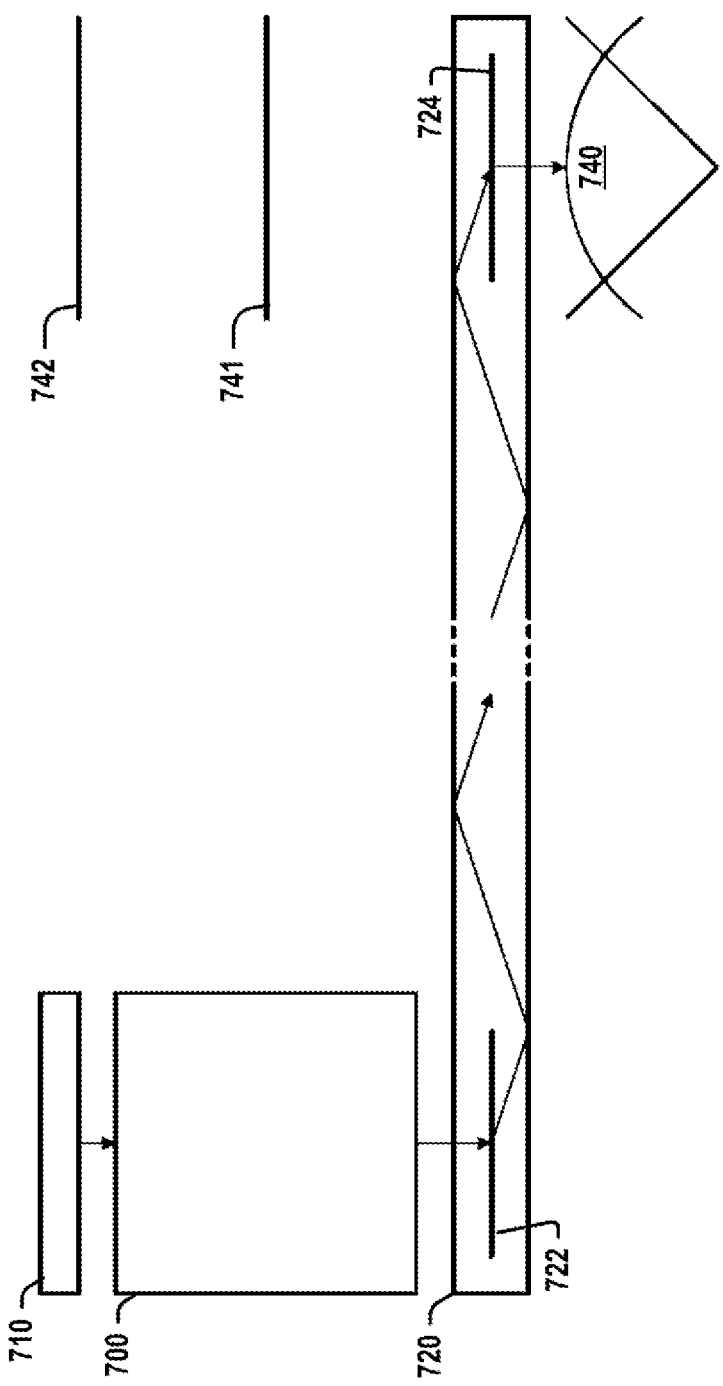
FIG. 7 illustrates a schematic of an optical system displaying images on different observation planes, according to an embodiment of the present invention.
Figure 7:

In an embodiment of the present invention, addressable HWP 217 may be driven, directed, or controlled to output s-polarized light from an addressable element (e.g., an individual reflective element or transmissive element of a modulation element in an array) of the addressable HWP 217, and that s-polarized light travels along light path 208, and transmits, directs, or outputs an image portion to input grating 222. In an embodiment of the present invention, addressable HWP 217 may be driven, directed, or controlled to output p-polarized light from an addressable element of the addressable HWP 217, and that p-polarized light travels along light path 209, and transmits or outputs an image portion to input grating 223. In an example, as shown in FIG. 4, an addressable HWP 217 may be a spatial light modulator. In an example, an addressable HWP 217 may be made or constructed from liquid crystal materials/substances and silicon, such as high temperature poly-silicon (HTPS). In an example, the addressable HWP 217 may be a transmissive spatial light modulator. Further, two oppositely polarized portions of the image can be placed at different observation planes as illustrated in FIG. 7.

In an embodiment of the present invention, light of one polarization (e.g. s-polarization) will travel along a path that is different from the path that the light of the other polar- ization (e.g. p-polarization) travels. For example, a light component of a first polarization travels along light path 208, and a light component of a second polarization travels along path 209. In an example, after the light component of the first polarization is reflected off the first reflective element 203 (comprising a mirror or reflective lens), it makes a second pass through the PBS 201, and after light of a second polarization is reflected off the second reflective element 205, it makes a second pass through the PBS 201. In an example, light of a first polarization, travels along light path 208 (i.e., Path 1) and is incident on the input grating 222, and light of a different polarization travels along light path 209 (i.e., Path 2), and is incident on the input grating 223. In an example, each of the input gratings 222, 223, is positioned on, coupled to, and/or integrated into a wave- guide combiner 220, 221. Therefore, after light of a first polarization is incident onto input grating 222, the light of the first polarization propagates through the waveguide combiner 220. After light of a differing or second polariza- tion is incident onto the input grating 223, the light of the differing or second polarization propagates through the waveguide combiner 221. In an example, p-polarized light propagates through waveguide combiner 220, and s-polar- ized light propagates through waveguide combiner 221. In an example, each of the waveguide combiners 220, 221 include or may include, incorporate, or be coupled to a polarization-sensitive input grating 222, 223. In an example, a waveguide combiner 220, 221 may be constructed from a phase separation structure or device, for example, a holo- graphic polymer dispersed liquid crystal (HPDLC) medium, grating, substance or material. In an example, the input gratings 222, 223 couple the light beams (corresponding to, for instance, images or image portions received at each of the input gratings 222, 223) into the waveguide combiners 220, 221 in which the input gratings 222, 223 respectively reside. In an example, at least one of the input gratings 222, 223 may be an electrically switchable grating. In an example a HPDLC device may be utilized as the electrically switch- able grating. In an example, light that exits the PBS 201 is de-multiplexed via the input gratings 222, 223, based on the polarization of the incoming light/image portions. In an example, coupling the light directed to each observation plane into separate waveguides 220, 221 allows the light directed to each plane to be manipulated independently by downstream optical components, as is described in more detail below with regard to FIG. 7. This capability of the present invention, could be advantageous when using well- known pupil replication techniques to expand the eye box (i.e., the region in which a user's eye is able to see the projected image) since the optical path of each observation plane may need to be manipulated or compensated differ- ently due to, for example, differences in the perceived location of various observation planes. See, for example, FIGS. 3-4 and 7 illustrating image portions comprising light beams of different polarizations projected on different obser- vation planes.

FIG. 3 illustrates portions of an image routed through separate light paths and incident on different observation planes, according to an example embodiment. As described herein, one or more light beams processed by exemplary optical systems, such as any of the optical systems according to embodiments described herein, can correspond to a synthetic image and/or portions of synthetic images, and such synthetic images may be combined with reality to generate an augmented reality (AR) image. In an embodiment, image 330 in FIG. 3 is a synthetic image that is projected onto one or more observation planes via one or more optical paths. In the example illustrated in FIG. 3, the image 330 is a synthetic image that comprises two synthetic portions 331 and 332 (i.e., image portions corresponding to a mountain at a far observation plane and a bird at a near observation plane, respectively). In this example, a controllable HWP can be used to output the different image portions 331, 332 using HWP configurations 334 at different times (e.g., subframes) T=1, T=2. For example, a light component or beam corresponding to an image portion 331 travels along a first light path and reaches a first input grating (e.g., one of input gratings 222, 223 in FIG. 2) at one instance in time or over one period of time, and a light component or beam corresponding to an image portion 332 travels along a second light path and reaches or arrives at a second input grating, and is output from the system at a different instance in time or over a second period of time. The periods of time are smaller than the integration time of the human visual system, such that an observer perceives both image portions 331, 332 as being simultaneously present. Thus, the two image portions 331, 332 (i.e., the mountain portion and the bird portion) may be transmitted in a time-divisional manner, and thereby appear to the human eye as occurring in a single image, as shown in the cube of FIG. 3, while being incident on different input gratings in different waveguide combiners, and, therefore appearing on different observation planes. This is enabled by, for example, encoding different lens parameters in output gratings, changing a focal plane of each image path (e.g., by changing a shape or position of a respective reflective element, through the use of refractive elements, and the like), or inserting a physical lens between the waveguide combiners.

Figure 4A:
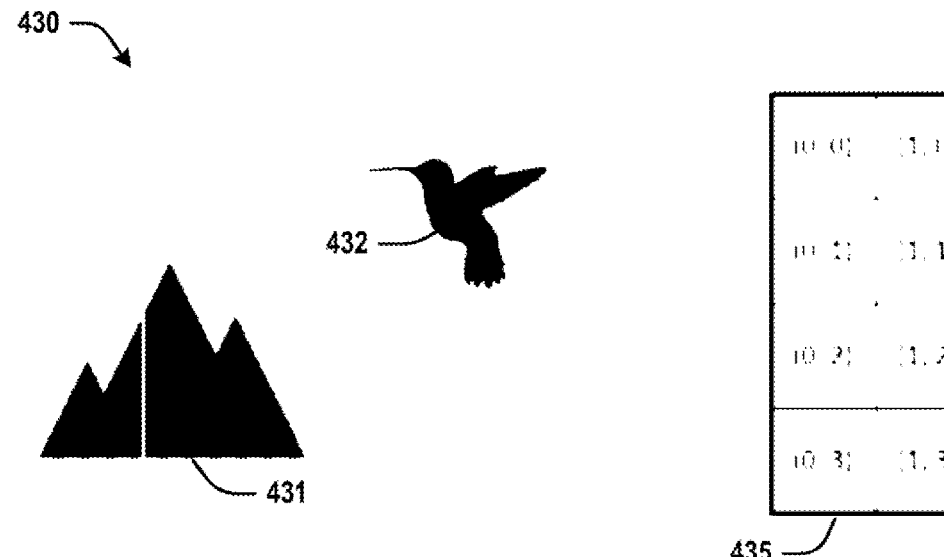
FIG. 4A and FIG. 4B illustrate half wave plate (HWP) configurations for routing portions of an image to separate observation planes, according to an embodiment of the present invention.
Figure 4B:
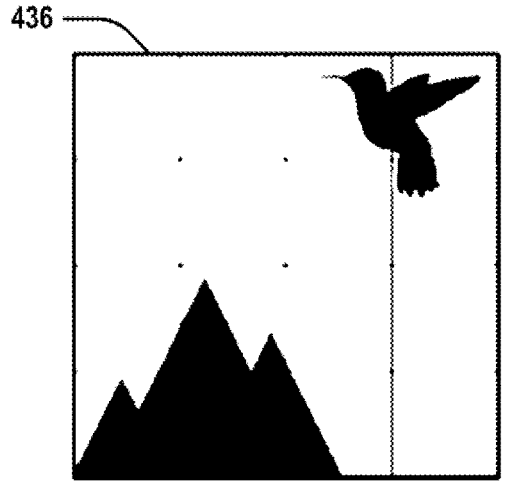

FIGS. 4A-4B illustrate half wave plate (HWP) configurations for routing portions of an image to separate observation planes, according to an example embodiment. As described herein, one or more light beams processed by exemplary optical systems can correspond to a synthetic image and/or portions of synthetic images, whereby the synthetic image is combined with reality to generate an augmented reality (AR) image. Thus, image 430 in FIG. 4A is projected on one or more observation planes, and includes at least two synthetic portions 431 and 432 (i.e., a mountain and a bird, respectively). In this example, an addressable HWP can be used to output the different image portions 431, 432 using HWP configurations 435 that instruct different elements of the HWP to transmit different light beams to different light paths of an exemplary optical display engine. For example, the addressable HWP (such as HWP 217 in FIG. 2) includes a plurality of independently controlled elements, wherein each of the independently controlled elements rotates a polarization of the polarized light beam. Separate portions of the plurality of independently controlled elements rotate the polarization of different light beams associated with separate image portions 431, 432. With reference to FIG. 4B, the HWP mapping 436 corresponds to the HWP setting 434. In some examples, the addressable HWP comprises one or more of a spatial light modulator or a transmissive spatial light modulator. In an embodiment, an addressable HWP is controlled by a control unit that sets a retardance of each pixel element of addressable HWP to direct incoming light beams to either path 1 or path 2 (by rotating the polarization). The mapping of the pixels of the HWP is analogous to a binary image, where one image value (i.e., HWP setting) is routed through path 1, and another image value is routed down path 2.

Figure 5:
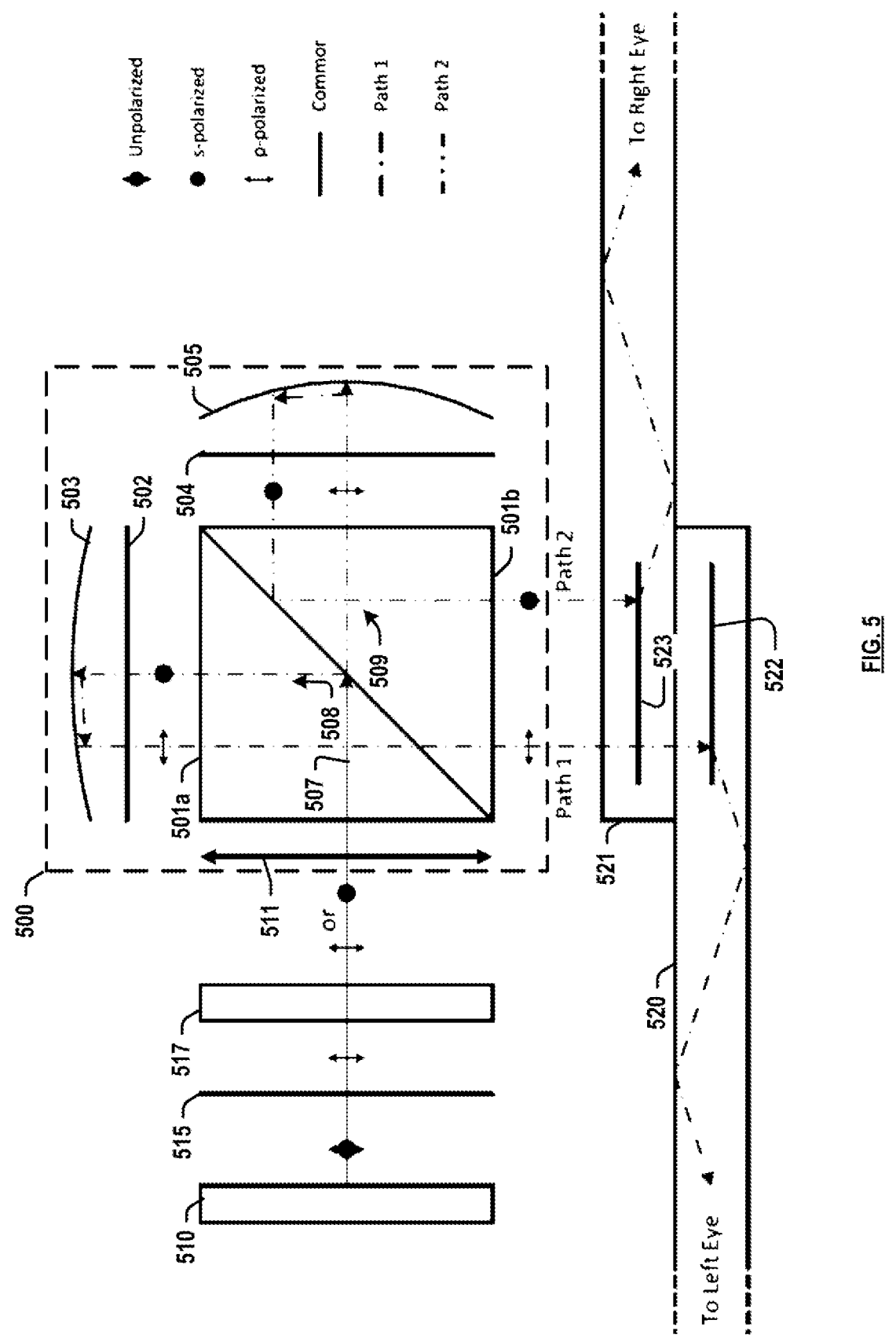
FIG. 5 illustrates an optical system for providing separate light paths directed towards left and right eyes, according to an embodiment of the present invention.

FIG. 5 illustrates an optical system for providing separate light paths directed towards left and right eyes, according to an example embodiment. The system illustrated in FIG. 5 includes at least an optical display engine 500, display 510, polarizer 515, HWP 517, waveguide combiners 520, 521, and input gratings 522 and 523. In this example, an unpolarized light beam emitted from display device 510 is linearly polarized by a polarizer 515, and the polarization is rotated and/or controllably selected by a half wave plate (HWP) 517. Thus, the unpolarized light beam becomes a polarized light beam 507 as it passes through the polarizer 515 and HWP 517, wherein the HWP 517 rotates a polarization of the polarized light beam such that the polarized light beam is directed into one of the first light path 508 or the second light path 509 depending on the rotation of the polarization. For example, the polarized light beam 507 is s-polarized as it enters the PBS 501, and becomes p-polarized upon entering the first light path 508, passing through the first QWP 502 to the first reflective element 503, being reflected by the first reflective element 503, and passing back through the first QWP 502 and into the PBS 501. Alternatively or in addition, the polarized light beam 507 is p-polarized as it enters the PBS 501, and becomes s-polarized upon entering the second light path 509, passing through the second QWP 504 to the second reflective element 505, being reflected by the second reflective element 505, and passing back through the second QWP 504 and into the PBS 501. Both light components (e.g. the separate light beams traversing light paths 508, 509) are combined in PBS 501 and emitted from the bottom side of PBS 501 (with "bottom side" referring to the orientation illustrated in FIG. 5).

In this example, the one or more light beams output via the bottom side of the PBS 501 are incident on one or more input gratings 522, 523. For example, the one or more input gratings 522, 523 comprise polarization-sensitive input gratings, wherein a first light beam exiting the first light path 508 with the second type of polarization is incident on a first input grating 522, and wherein a second light beam exiting the second light path 509 with the first type of polarization is incident on a second input grating 523. In some examples, the one or more input gratings 522, 523 comprise electrically-switchable input gratings. In some examples, each of the one or more input gratings 522, 523 is respectively coupled to a waveguide combiner 520, 521. Further, an output grating (discussed in more detail below with regard to FIG. 7) can be coupled to the waveguide combiners 520, 521, wherein the one or more light beams propagate along the waveguide combiner until reaching the output grating, wherein the output grating combines the synthetic image with reality to generated an augmented reality (AR) image (see, for example, the embodiment illustrated in FIG. 7). In this particular example, one waveguide/waveguide combiner 520 is used for the left eye and the other waveguide combiner 521 is used for the right eye. This enables usage of a single optical system illustrated herein to create a binocular headset is using only one display 510, for example, a micro-LED display.

Figure 6:
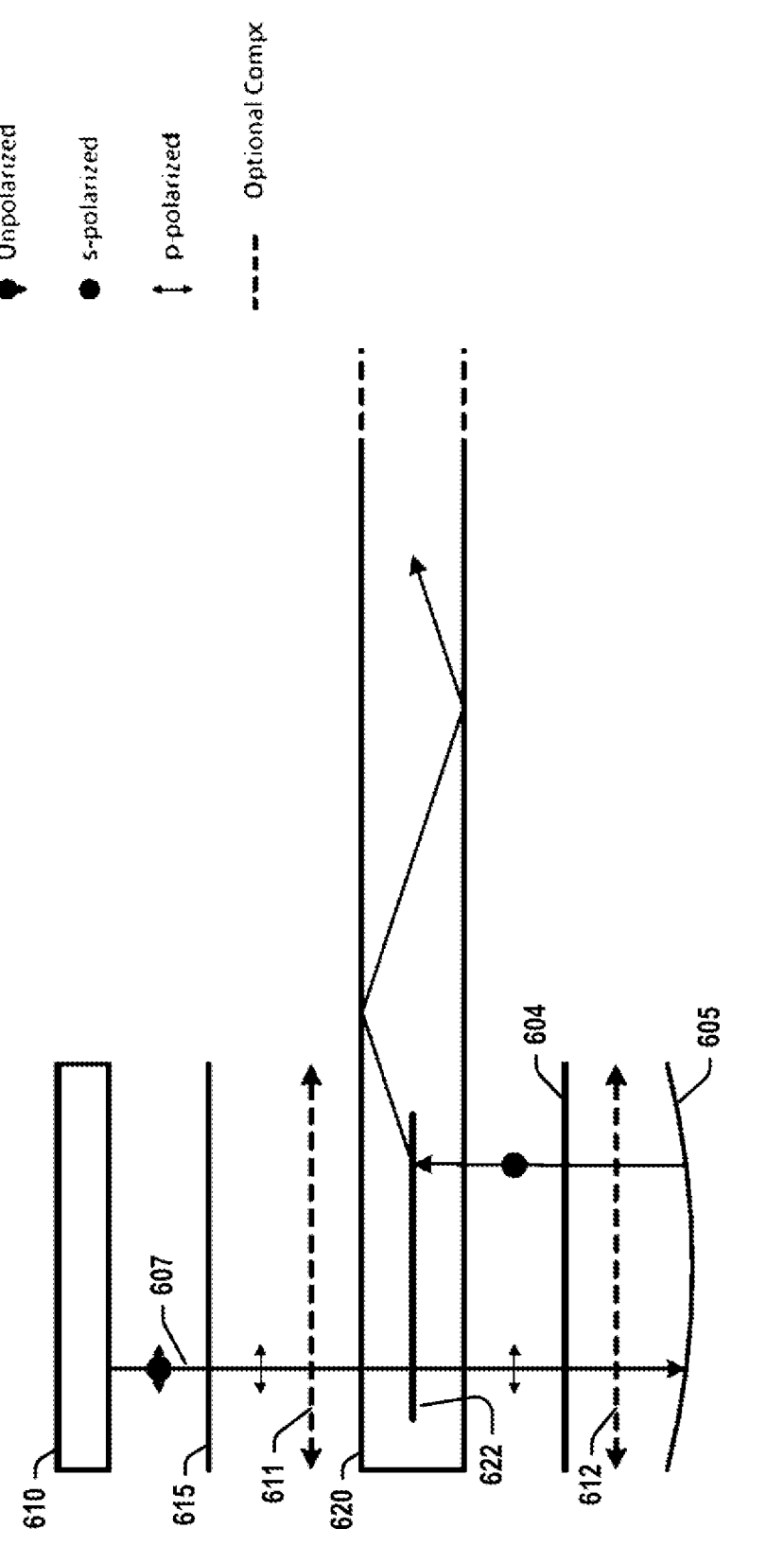
FIG. 6 illustrates an optical system comprising a waveguide combiner, according to an embodiment of the present invention.

FIG. 6 illustrates an optical system comprising a waveguide combiner, according to an embodiment of the present invention. In this example, an image in the form of unpolarized light beam 607 generated by a display device 610

(such as, for example, a microLED display device) is received at a polarizer 615 and passes through the polarizer 615, and after such passing, the unpolarized light beam 607 becomes polarized. In an example, any number of refractive lenses 611 can focus the unpolarized light beam 607 before the unpolarized light beam 607 passes through a waveguide combiner 620. In an example, a refractive lens 611 begins to focus the light that has passed through the polarizer 615 before it passes through the waveguide combiner 620 with minimal interaction with the polarization-sensitive input grating 622, by virtue of input grating 622 acting with respect to a particular polarization of incoming light. Then, an appropriately orientated QWP 604 (for example a QWP 604 that is positioned such that its fast axis is at forty-five degrees with respect to the polarization of the incoming light beam 607) converts the polarization of the light exiting the waveguide combiner 620 from linear polarization to circular polarization. In the illustration of FIG. 6, the fast axis lies in the same plane as the QWP 604 and is thus not separately illustrated. In some embodiments, any number of refractive lenses 611, 612 impart optical power on the light, for example, based on the shape and/or material of the refractive lenses 611, 612. In an embodiment, a reflective element 605 (such as, for example, a reflective lens or curved mirror) imparts optical power based on the curvature of the reflective element 605, and changes the handedness of the polarization of the now-polarized light beam transmitted to and received by the reflective element 605 from the QWP 604. In an example, the light reflected from the reflective element 605 makes a second pass through the QWP 604 (and, optionally, refractive lens 612), and the QWP 604 convert the light back to linear polarization at an orientation that is orthogonal to the orientation of the light beam 607 when it passed through the input grating 622 during the first pass. The input grating 622 then optically couples or directs the light beam that was received at the input grating 622 from reflective element 605 into the waveguide combiner 620.

FIG. 7 illustrates a schematic of an optical system displaying images on different observation planes and thereby illustrates behavior of light downstream from an optical display engine, according to an example embodiment. In this example, an optical display engine 700, including, for example, the components illustrated in FIGS. 1, 2, 5, and 6, may work in conjunction with, for example, a display 710 (which may include an LED display, micro-LED display, OLED display, micro-OLED display, etc.). Some or all of the components of the optical display engine 700 may be coupled to the display 710, integrated with the display 710, and/or assembled with the display 710, such that an image is generated, for example, a synthetic image (e.g., a computer-generated image or an image that is created as an overlay to a real world scene or imagery, as illustrated in FIGS. 3-4). An input grating 722 receives one or more light beams corresponding to the synthetic image (and/or image portions), and couples it into a waveguide combiner 720. The one or more light beams then propagate along the waveguide combiner 720 until reaching an output grating 724, which combines the synthetic image with reality (i.e., the real world scene or imagery), enabling presentation of a desired AR image or image portion (e.g., the synthetic image combined with reality or real image) to the eye 740.

In an embodiment of the present invention, a display system in accordance with the disclosed embodiments (e.g. as described in FIGS. 1, 2, 5, and 6) includes a controllable or addressable HWP that, by directing s-polarized light and p-polarized light along different paths by virtue of the particular control applied to the HWP, directs two or more oppositely polarized light beams corresponding to different image portions at different observation planes 741, 742. For example, s-polarized light is directed to one of the observation planes 741, 742, and p-polarized light is directed to another of the observation planes 741, 742. It should be understood by one of ordinary skill in the art that an observation plane 741, 742 may be a plane in space or an optical plane, device and/or substrate (for example, a plane where an image, real, virtual, augmented, or otherwise, is placed, presented, or located).

In some examples, one or more reflective elements within optical display engine 700 can include deformable or movable mirrors that enables control over an observation distance via the changing of the power and/or position of the mirrors. In an example, the power of a reflective element is changed by deforming the surface and changing the curvature of the reflective element such that, during operation, each of the initial p-polarized light and s-polarized light portions are reflected off an optical element within optical display engine 700. This enables control over an observation distance (i.e., a distance from the eye 740 of a viewer to an observation plane 741, 742) via the changing of the power and/or position of the reflective element which reduces mismatch between synthetic images and real world images and enables mitigation of VAC.

In some exemplary embodiments, a perceived resolution of a display (e.g., a near-eye display or AR display incorporating the example optical display engines described herein) can be dynamically altered using temporal multiplexing techniques. For example, with reference to FIG. 8A-8C, an increase in the perceived resolution of a display is achieved or displayed via optical systems providing different optical paths for differently polarized light, in accordance with the present invention, such as those of FIGS. 1, 2, 5, 6, and/or 7 above. For example, in accordance with an embodiment of the present invention, a high resolution image or image portion 832 is displayed (via Path 2 of exemplary optical display engines described herein) at a position that corresponds to the portion of the viewer's FOV defined by the fovea region of the retina, while a lower-resolution image or image portion 831 is displayed (via Path 1 of exemplary optical display engines described herein) at a portion of the viewer's FOV surrounding the fovea region of the retina. It is generally understood by those having ordinary skill in the art that human visual acuity is only very high over a narrow FOV defined by the fovea region of the retina (i.e., retinal resolution). Thus, a system in accordance with any of the aforementioned embodiments may be utilized to project images of different resolutions from a single display unit as a desired synthetic image 830 on an observation plane. For example, when a controllable HWP is utilized, an image or image portion of a first resolution (e.g. one of image portions 831, 832) is projected at a first instance in time or time period (T=1), and a second image or image portion of a second resolution (e.g. one of image portions 831, 832) is projected at a second instance in time or time period (T=2). In an example, a controllable HWP is utilized to project the image or image portion of a first resolution at a first instance in time (or over a first time period) and the second image or image portion at a second instance in time (or over a second time period), during the same frame. In an example, a first image or image portion travels along Path 1, and a second image or image portion travels along Path 2.

Figure 8A:
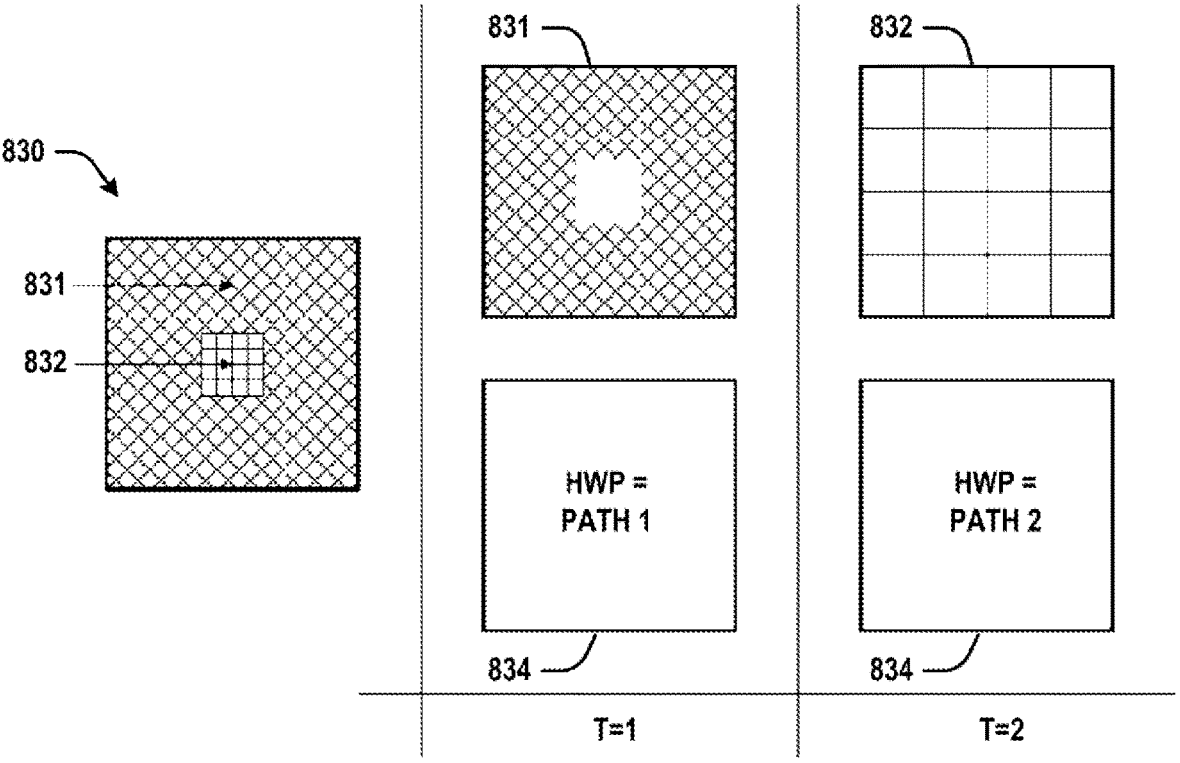
FIGS. 8A-8C illustrate projection of image portions with different resolutions, according to an embodiment of the present invention.

By directing or generating a high-resolution image to the display for only images or portions of an image that a viewer is capable of seeing in high resolution, it is possible to emulate a large, high-resolution FOV with a small, lower-resolution, more power efficient display. As shown in FIG. 8A, light traveling along Path 1 projects or results in a first image or image portion 831 (i.e., a low-resolution image, region, or image portion represented by the "x" or "diamond-shaped" hashed pattern) from the display (e.g., a microdisplay) over a wide FOV at a low angular resolution (and the central region, or region where the human eye 840 is able to resolve or perceive imagery of high resolution, is left blank). Conversely, light traveling along Path 2 projects or results in a second image or image portion 832 (i.e., a high-resolution or higher-resolution image, region, or image portion represented by the "checkered" pattern) from the display (e.g., a microdisplay) over a narrow central FOV at a much higher angular resolution. These projected regions form the peripheral region (i.e., the "x" or "diamond-shaped" hatched low-resolution region) and the foveal region of the image (i.e., the "checkered" high-resolution region), as seen by the eye 840. In an example, a display system switches between outputting or generating the low-resolution image and the high-resolution image faster than the user can perceive, ensuring that the user will perceive a single image at or above retinal resolution over the full FOV.

Figure 8B:
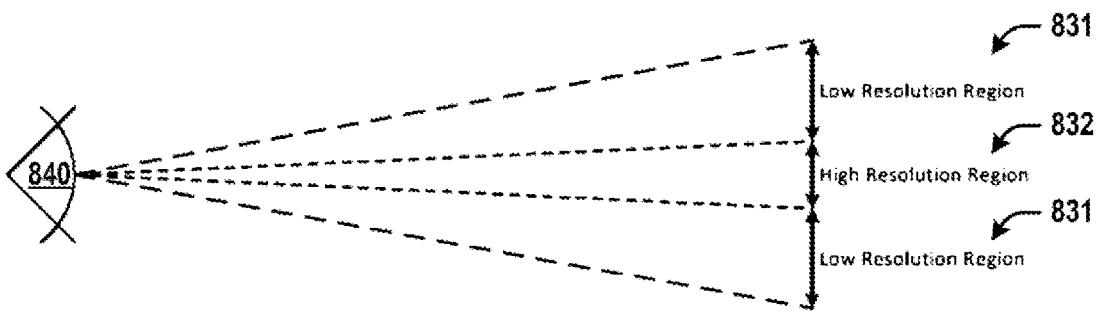
Figure 8C:
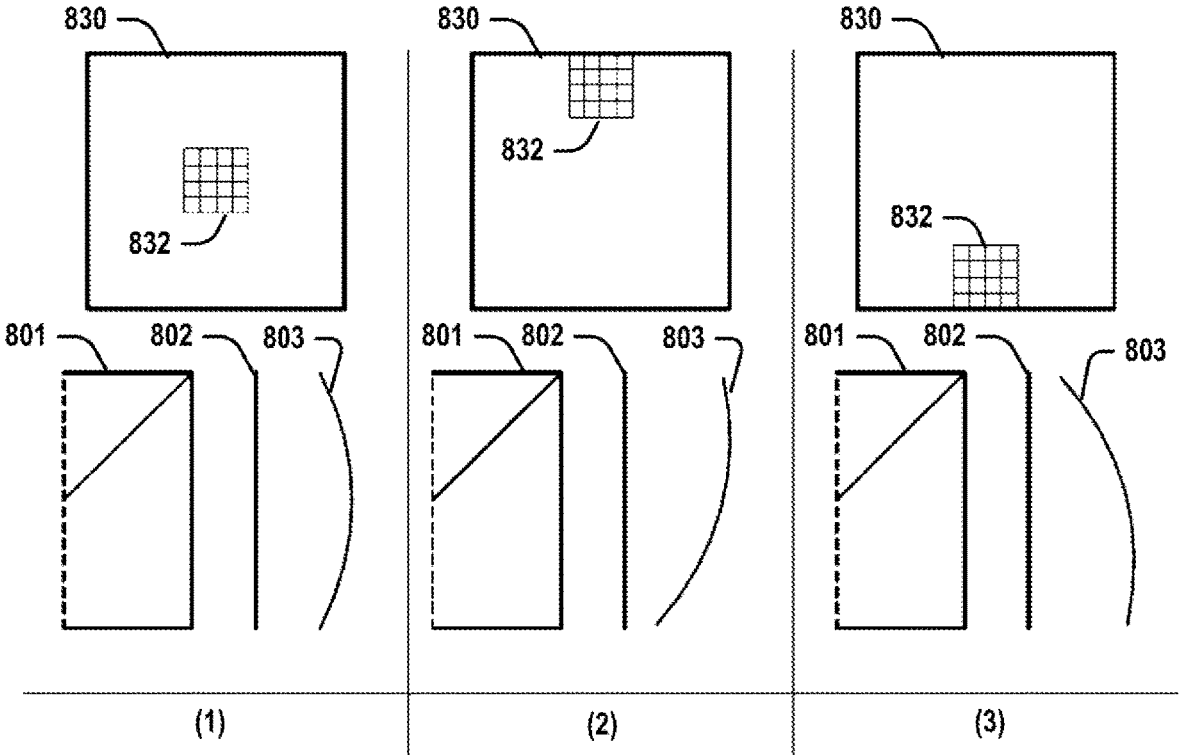

It can further be assumed by those having ordinary skill in the art that humans try to keep their eyes in a centered and relaxed position to avoid muscle strain. Thus, in some examples, the higher-resolution region may be fixed to the center of the FOV, such that an image or image portion 832, for example, the higher-resolution region, image, or image portion, naturally aligns with the user's fovea, as illustrated in FIG. 8B. Alternatively or in addition, as shown in FIG. 8C, some examples can utilize deformable and/or movable reflective elements 803 to move the high-resolution region (comprising image portion 832) around a user's FOV. In FIG. 8C, a partial optical system is shown including a portion of a PBS 801, a QWP 802, and a reflective element 803. This may correspond to any of the optical systems described above with regard to FIGS. 2 and/or 7, such as the PBS 201, the second QWP 204, and the second reflective element 205 of FIG. 2; and/or the optical display engine 700 of FIG. 7. In configuration (1) of FIG. 8C, the reflective element 803 is not tilted or deformed, and therefore the image or image portion 832 is located in a center of the synthetic image 830. In configuration (2) of FIG. 8C, the reflective element 803 is tilted or deformed in a first direction, and therefore the image or image portion 832 is located in an upper region of the synthetic image 830. In configuration (3) of FIG. 8C, the reflective element 803 is tilted or deformed in a second direction opposite the first direction, and therefore the image or image portion 832 is located in a lower region of the synthetic image 830.

In this example, a region, image, or image portion may be moved to a position or location in any combination of the x, y, and z planes, and is not limited merely to movement in the up-down direction. When combined with eye tracking sensors and related techniques, a system configured with movable and/or deformable reflective elements 803 can move an image, region, or image portion, for example, the high-resolution region, image, or image portion 832 to align with a user's gaze. Thus, large FOV images at a high perceptual resolution can be created with a single relatively low-resolution microdisplay. A lower-resolution microdisplay results in a smaller, less costly, and more power efficient system.

Figure 9C:
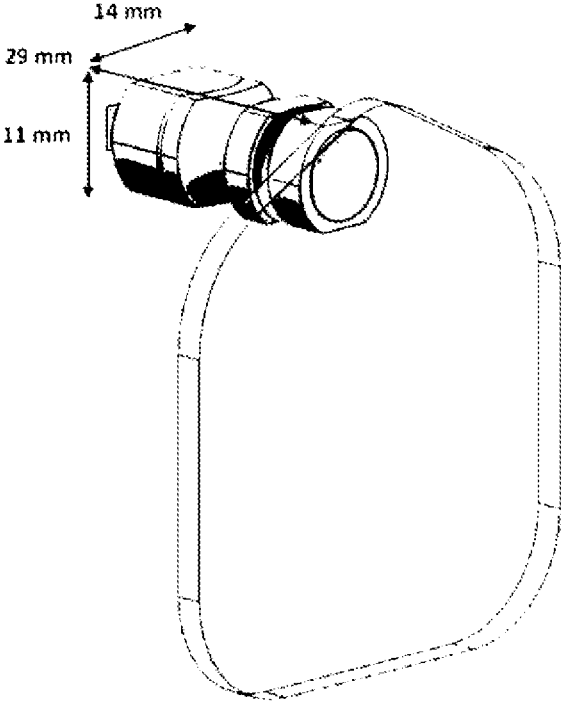
FIG. 9C illustrates approximate dimensions of an optical system, according to a comparative example.

FIGS. 9A-9B illustrate approximate dimensions of optical systems, according to example embodiments. These illustrations depict the approximate dimensions of different embodiments (e.g., the embodiments of FIGS. 2 and 6). FIG. 9C illustrates approximate dimensions of an optical system according to a comparative example. For comparison sake, the display systems shown in these illustrations include a 0.37"-color-microLED 910 display having a resolution of 2720×1530 (Bayer pattern) with a pixel pitch of 3.015 μm, a display space f/# of 2, a FOV of 40°, and an exit pupil diameter of 6 mm. FIG. 9A illustrates an optical display engine 901 coupled to reflective elements 903, 905, a display 910, and a refractive lens 911, further coupled to input grating 922 and waveguide combiner 920. This embodiment corresponds to, for instance, the optical systems illustrated in FIG. 2. FIG. 9B illustrates an optical display engine 905 and a display 910, further coupled to input grating 922 and waveguide combiner 920, corresponding to the optical system illustrated in FIG. 6. FIG. 9C illustrates a comparative system with a display coupled to an input grating and a waveguide combiner, but without an optical engine disposed therebetween. It will be understood by those having ordinary skill in the art that these dimensions are exemplary, and that different components and applications would result in different dimensions. When considering image quality, all of the examples perform similarly and as might be expected for an AR system. However, the systems illustrated in FIGS. 9A and 9B (respectively corresponding to the exemplary optical systems of FIGS. 2 and 6) result in a significant size reduction and form factor when compared with a solely refractive optical system. When compared by volume, the systems of FIGS. 9A and 9B (that is, the systems according to example embodiments) have volumes that are 50% and 25%, respectively, of the volume of the system of FIG. 9C (that is, the systems according to the comparative example). Additionally, the folded optical path and orientation of a system (e.g., as illustrated in FIGS. 1, 2, 5, 6, and 9A-9B) allow for improved industrial design and heat dissipation in top mounted AR systems, as the bulk of the optical engine can be oriented up and away from a user's face and the primary heat source (a display) can be placed or located on the top side of the system to allow for better natural convection.

In an example, in any of the aforementioned embodiments, the HWP can include a switchable HWP with a pre-polarizer, e.g. a BVO (Boulder Vision Optik)® Pi-cell that is 38 mm×35.5 mm×1.4 mm. In an example, in any of the aforementioned embodiments, the PBS can include a Colorlink® Film PBS that is 15 mm×15 mm×15 mm. In an example, in any of the aforementioned embodiments, a QWP can include a Colorlink® QWG with 138 nm retardance. In an example, in any of the aforementioned embodiments, a reflective element can include a 15 mm focal length concave mirror, such as Edmund Optics® part number 46-234. In an example, in any of the aforementioned embodiments, the reflective element can be mounted on a translation stage, with a 0.5 mm translation between focus at infinity and focus at 18" distance. In an example, in any of the aforementioned embodiments, one or more axes of motion for the reflective element(s) can be accomplished by miniaturized voice coil or piezo-electric actuators, and deformation can be accomplished by use of a piezo film on glass membrane over a polymer substrate or with a micro-electromechanical systems (MEMS) structure under a thin mirror surface.

Operation of optical display engine 100 and/or display device 110 may be controlled by one or more processors, not shown herein but understood as being incorporated by those having ordinary skill in the art in light of this disclosure. In an example embodiment, the one or more processors may include a GPU ("graphics processing unit"), an SoC ("system on a chip"), a CPU ("central processing unit"), a DSP ("digital signal processor"), an ASIC ("application specific integrated circuit"), or the like. Further, additional components not illustrated herein may be contemplated by those of ordinary skill in the art in light of this disclosure. For example, a sensor data acquisition module to obtain, receive and/or store sensor data acquired from a variety of sensors, such as inertial measurement sensor, an ambient light sensor, a temperature sensor, an image sensor, and/or an eye tracking sensor. These are specific illustrative and non-exhaustive examples of sensors, and other sensors may also be used.

Aspects of the subject matter described herein may be implemented in digital electronic circuitry, or in computer software, firmware, or hardware, including the structural means disclosed in this specification and structural equivalents thereof, or in combinations of them. The subject matter described herein can be implemented in special purpose logic circuitry, e.g., an FPGA (field programmable gate array) or an ASIC (application specific integrated circuit).

It is to be understood that the disclosed subject matter is not limited in its application to the details of construction and to the arrangements of the components set forth in the following description or illustrated in the drawings. The disclosed subject matter is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods, and systems for carrying out the several purposes of the disclosed subject matter. It is important, therefore, that the claims be regarded as including such equivalent constructions insofar as they do not depart from the spirit and scope of the disclosed subject matter.

Although the disclosed subject matter has been described and illustrated in the foregoing example embodiments, it is understood that the present disclosure has been made only by way of example, and that numerous changes in the details of implementation of the disclosed subject matter may be made without departing from the spirit and scope of the disclosed subject matter, which is limited only by the claims which follow.

What is claimed is:

1. A display system, comprising:
a polarizing beam splitter (PBS) positioned to receive one or more light beams from a display device via a third side, wherein the display device emits at least one unpolarized light beam;
a first quarter wave plate (QWP) positioned outside a first side of the PBS;
a first reflective element positioned adjacent the first QWP;
a second QWP positioned outside a second side of the PBS;
a second reflective element positioned adjacent the second QWP;
a polarizer positioned between the display device and the PBS, wherein the unpolarized light beam becomes a polarized light beam as it passes through the polarizer; and
a half wave plate (HWP) positioned between the polarizer and the PBS, wherein the HWP rotates a polarization of the polarized light beam, wherein a first light path for a first type of polarization is created by a combination of the PBS, the first QWP, and the first reflective element, and a second light path for a second type of polarization is created by a combination of the PBS, the second QWP, and the second reflective element,
wherein the PBS is positioned to output the one or more light beams traversing the first and second light paths to one or more observation planes via a fourth side,
wherein the one or more light beams output via the fourth side of the PBS comprise:
a first light beam exiting the first light path via the fourth side of the PBS with the first type of polarization and incident on a first polarization-sensitive input grating coupled to a first waveguide combiner, the first light beam that exited the first light path incident on the first polarization-sensitive input grating with the first type of polarization; and
a second light beam exiting the second light path via the fourth side of the PBS with the second type of polarization and incident on a second polarization-sensitive input grating coupled to a second waveguide combiner, the second light beam that exited the second light path incident on the second polarization-sensitive input grating with the second type of polarization,
wherein the second polarization-sensitive input grating overlaps the first polarization-sensitive input grating and is closer to the fourth side of the PBS than the first polarization-sensitive input grating such that the first light beam having the first type of polarization passes through the second polarization-sensitive input grating before being incident on the first polarization-sensitive input grating with the first type of polarization,
wherein the first polarization-sensitive input grating propagates the first light beam having the first type of polarization in a first direction toward a first output grating coupled to the first waveguide combiner, and
wherein the second polarization-sensitive input grating propagates the second light beam having the second type of polarization in the first direction toward a second output grating coupled to the second waveguide combiner.

2. The display system of claim 1, wherein the display device comprises one or more of a light emitting diode (LED), micro-LED, organic LED (OLED), micro-OLED, liquid crystal display (LCD).

3. The display system of claim 1, wherein the PBS splits incoming light into a first light component with the first type of polarization and a second light component with the second type of polarization, reflects the first light component into the first light path to the first QWP and first reflective element, and transmits the second light component into the second light path to the second QWP and second reflective component.

4. The display system of claim 3, wherein a polarization of each of the first and second light components is reversed as the first and second light components respectively travel along the first and second light paths.

5. The display system of claim 4, wherein:
the first light component is s-polarized as it enters the PBS and becomes p-polarized upon entering the first light path, passing through the first QWP to the first reflective element, being reflected by the first reflective element, and passing back through the first QWP and into the PBS, wherein the PBS transmits the first light component through the fourth side; and the second light component is p-polarized as it enters the PBS and becomes s-polarized upon entering the second light path, passing through the second QWP to the second reflective element, being reflected by the second reflective element, and passing back through the second QWP and into the PBS, wherein the PBS transmits the second light component through the fourth side.

6. The display system of claim 1, wherein the polarized light beam is s-polarized as it enters the PBS, and becomes p-polarized upon entering the first light path, passing through the first QWP to the first reflective element, being reflected by the first reflective element, and passing back through the first QWP and into the PBS.

7. The display system of claim 1, wherein the polarized light beam is p-polarized as it enters the PBS, and becomes s-polarized upon entering the second light path, passing through the second QWP to the second reflective element, being reflected by the second reflective element, and passing back through the second QWP and into the PBS.

8. The display system of claim 1, wherein the HWP comprises a controllable HWP and is coupled to a controller that determines how the controllable HWP rotates the polarization of the polarized light beam.

9. The display system of claim 8, wherein the controllable HWP rotates a polarization of differently polarized light beams at different particular instances in time.

10. The display system of claim 1, wherein the HWP comprises an addressable HWP, the addressable HWP further comprising a plurality of independently controlled elements, wherein each of the independently controlled elements rotates a polarization of the polarized light beam.

11. The display system of claim 10, wherein separate portions of the plurality of independently controlled elements rotate a polarization of different light beams associated with separate image portions.

12. The display system of claim 11, wherein the addressable HWP comprises one or more of a spatial light modulator or a transmissive spatial light modulator.

13. The display system of claim 1, wherein the first polarization-sensitive input grating and the second polarization-sensitive input grating are electrically-switchable input gratings.

14. The display system of claim 1, further comprising a first output grating coupled to the first waveguide combiner and a second output grating coupled to the second waveguide combiner, wherein the first light beam propagates along the first waveguide combiner until reaching the first output grating and the second light beam propagates along the second waveguide combiner until reaching the second output grating.

15. The display system of claim 14, wherein:

the one or more light beams correspond to a synthetic image, and the first output grating and the second output grating combines the synthetic image with reality to generate an augmented reality (AR) image.

16. The display system of claim 14, wherein the first polarization-sensitive input grating and the second polarization-sensitive input grating and/or the first output grating and the second output grating comprise holographic polymer dispersed liquid crystal (HPDLC).

17. The display system of claim 1, wherein each of the first and second reflective elements comprises at least one of a mirror, deformable mirror, or moveable mirror.

18. An optical display engine, comprising:

a polarizing beam splitter (PBS) comprising at least four sides, wherein a first side is positioned to receive one or more light beams from a display device and a second side is positioned to output the one or more light beams to one or more observation planes, wherein the display device emits at least one unpolarized light beam;

a first quarter wave plate (QWP) and a first reflective element positioned outside a third side of the PBS opposite to the second side, wherein a first light path is created for a first light component having a first polarization from among the one or more light beams, and wherein the first polarization is reversed as the first light component traverses the first path and exits the second side of the PBS;

a second QWP and a second reflective element positioned outside a fourth side of the PBS opposite to the first side, wherein a second light path is created for a second light component having a second polarization from among the one or more light beams, and wherein the second polarization is reversed as the second light component traverses the second path and exits the second side of the PBS;

a polarizer positioned between the display device and the PBS, wherein the unpolarized light beam becomes a polarized light beam as it passes through the polarizer; and a half wave plate (HWP) positioned between the polarizer and the PBS, wherein the HWP rotates a polarization of the polarized light beam, wherein the polarized light beam is directed into one of the first or second light paths depending on the rotation of the polarization, wherein the one or more light beams output via the second side of the PBS comprise:

a first light beam exiting the first light path via the second side of the PBS with the first polarization and incident on a first polarization-sensitive input grating coupled to a first waveguide combiner, the first light beam that exited the first light path incident on the first polarization-sensitive input grating with the first polarization; and a second light beam exiting the second light path via the second side of the PBS with the second polarization and incident on a second polarization-sensitive input grating coupled to a second waveguide combiner, the second light beam that exited the second light path incident on the second polarization-sensitive input grating with the second polarization, wherein the second polarization-sensitive input grating overlaps the first polarization-sensitive input grating and is closer to the second side of the PBS than the first polarization-sensitive input grating such that the first light beam having the first polarization passes through the second polarization-sensitive input grating before being incident on the first polarization-sensitive input grating with the first polarization, wherein the first polarization-sensitive input grating propagates the first light beam having the first polarization in a first direction toward a first output grating coupled to the first waveguide combiner, and wherein the second polarization-sensitive input grating propagates the second light beam having the second polarization in the first direction toward a second output grating coupled to the second waveguide combiner.

19. The optical display engine of claim 18, wherein the PBS splits incoming light into a first light component with the first polarization and a second light component with the second polarization, reflects the first light component into the first light path to the first QWP and first reflective element, and transmits the second light component into the second light path to the second QWP and second reflective component.

20. The optical display engine of claim 19, wherein a polarization of each of the first and second light components is reversed as the first and second light components respectively travel along the first and second light paths.

21. The optical display engine of claim 20, wherein:
   the first light beam is s-polarized as it enters the PBS and becomes p-polarized upon entering the first light path, passing through the first QWP to the first reflective element, being reflected by the first reflective element, and passing back through the first QWP and into the PBS, wherein the PBS transmits the first light component through the fourth side; and
   the second light beam is p-polarized as it enters the PBS and becomes s-polarized upon entering the second light path, passing through the second QWP to the second reflective element, being reflected by the second reflective element, and passing back through the second QWP and into the PBS, wherein the PBS transmits the second light component through the fourth side.

22. The optical display engine of claim 18, wherein the polarized light beam is s-polarized as it enters the PBS, and becomes p-polarized upon entering the first light path, passing through the first QWP to the first reflective element, being reflected by the first reflective element, and passing back through the first QWP and into the PBS.

23. The optical display engine of claim 18, wherein the polarized light beam is p-polarized as it enters the PBS, and becomes s-polarized upon entering the second light path, passing through the second QWP to the second reflective element, being reflected by the second reflective element, and passing back through the second QWP and into the PBS.

24. The optical display engine of claim 18, wherein the HWP comprises a controllable HWP and is coupled to a controller that determines how the controllable HWP rotates a polarization of the polarized light beam.

25. The optical display engine of claim 24, wherein the controllable HWP rotates a polarization of differently polarized light beams at different particular instances in time.

26. The optical display engine of claim 18, wherein the HWP comprises an addressable HWP, the addressable HWP further comprising a plurality of independently controlled elements, wherein each of the independently controlled elements rotates a polarization of the polarized light beam.

27. The optical display engine of claim 26, wherein separate portions of the plurality of independently controlled elements rotate a polarization of different light beams associated with separate image portions.

28. The optical display engine of claim 27, wherein the addressable HWP comprises one or more of a spatial light modulator or a transmissive spatial light modulator.

29. The optical display engine of claim 18, wherein the first polarization-sensitive input grating and the second polarization-sensitive input grating are electrically-switchable input gratings.

30. The optical display engine of claim 18, further comprising a first output grating coupled to the first waveguide combiner and a second output grating coupled to the second waveguide combiner, wherein the first light beam propagates along the first waveguide combiner until reaching the first output grating and the second light beam propagates along the second waveguide combiner until reaching the second output grating.

31. The optical display engine of claim 30, wherein the one or more light beams correspond to a synthetic image, and wherein the first output grating and the second output grating combines the synthetic image with reality to generate an augmented reality (AR) image.

32. The optical display engine of claim 30, wherein the first polarization-sensitive input grating and the second polarization-sensitive input grating and/or the first output grating and the second output grating comprise holographic polymer dispersed liquid crystal (HPDLC).

33. The optical display engine of claim 18, wherein the display device comprises one or more of a light emitting diode (LED), micro-LED, organic LED (OLED), micro-OLED, liquid crystal display (LCD).

* * * * *